United States Patent [19]
Hashimoto

[11] Patent Number: 5,726,522
[45] Date of Patent: Mar. 10, 1998

[54] DEVICE FOR GENERATING HIGH VOLTAGE

[75] Inventor: Takehiro Hashimoto, Hinode-machi, Japan

[73] Assignees: Japan Smoking Articles Corporate Association; Ceratic Coporation, both of Tokyo, Japan

[21] Appl. No.: 599,180

[22] Filed: Feb. 9, 1996

[30] Foreign Application Priority Data

Feb. 27, 1995 [JP] Japan ................. 7-063310
Feb. 27, 1995 [JP] Japan ................. 7-063311

[51] Int. Cl.⁶ .................................. H01L 41/08
[52] U.S. Cl. ........................................ 310/339
[58] Field of Search ................... 310/338, 339, 310/340; 361/260

[56] References Cited

U.S. PATENT DOCUMENTS

| | | | |
|---|---|---|---|
| 2,937,296 | 5/1960 | Logan | 310/339 X |
| 3,082,333 | 3/1963 | Hufferd et al. | 310/339 |
| 3,819,963 | 6/1974 | Kondo et al. | 310/339 |
| 4,051,396 | 9/1977 | Berlincourt | 310/340 |
| 4,158,215 | 6/1979 | Plozner | 310/339 X |
| 4,623,814 | 11/1986 | Kondo et al. | 310/339 |
| 5,550,420 | 8/1996 | Hsu | 310/339 |

FOREIGN PATENT DOCUMENTS 1510784 of 1978 United Kingdom .
2014375 of 1979 United Kingdom .

*Primary Examiner*—Mark O. Rudd
*Attorney, Agent, or Firm*—Ronald R. Snider

[57] ABSTRACT

A piezoelectric high voltage device has a high voltage lead line and a fixed container fixedly maintained without using an adhesive agent. A connecting portion between the lead line and a terminal plate is fixed by filling an adhesive agent thereupon. Kinetic energy caused by the hitting of a hammer can be changed into electric energy without any loss by use of Polytetrafluoroethylene.

13 Claims, 7 Drawing Sheets

DEVICE FOR GENERATING HIGH VOLTAGE

BACKGROUND OF THE INVENTION

Prior art devices using a piezoelectric element are widely utilized as a discharging electric supply to ignite cigarette lighters, household gas appliances, kerosene stoves or other wide fields for tools or equipments. In general, the device to generate high voltage comprises a fixed container and a movable container which moves axially, in relation with the fixed container, through the fixed container. The piezoelectric element is built in the fixed container, and the element is hit by a hammer with some energy which is stored during the relative movement caused between the fixed and movable containers, and by this hitting a high voltage is generated. The generated voltage is arranged to be picked up through a lead wire which is connecting with a high voltage terminal plate built in an electrode of the element.

In order to connect a lead line of high voltage with a terminal plate established in the electrode side of the piezoelectric element, an end of the lead line is mechanically connected with a linking hole or ditch formed in the terminal plate, or else the end is connected together with the terminal plate by such means by spot welding. After this spot connection, an adhesive as a filler is furnished with the gap constituting a connecting portion for firm adherence. The lead line is inserted in a U-shaped ditch established in an upper wall of a lead line terminating box of the fixed container, and then the adhesive is furnished around the small area produced by the lead line and the ditch for firm linking, and thus the linking portion between the lead line and the terminal plate is secure. At the same time, this tight linkage promotes the next working procedure where the connecting portion is filled with the adhesive filler.

However, through the prior art as explained so far, there exist some serious problems for production.

The first problem is as follows: When we use a two-part adhesive agent to link the lead line within the U-shaped ditch, we have to arrange an exact ratio for the using agent and also have to stir the two-part agent correctly, and these procedures are quite troublesome. It is also very difficult to supply only a required and limited quantity of agent to the ditch area, and moreover time is needed for drying and hardening processes. In addition, in case if we supply excess agent thereupon, the supplied portion forms an extra swell, whereas the measurement differs from its design specification as originally defined.

The second problem is: Epoxy adhesive agent is used to prevent breakage of the piezoelectric element, and silicone or urethan rubber is filled to maintain electric insulation in the gap between the element built in the fixed container and an inside wall of the container. The agent and filler restrain the lengthwise movement of the piezoelectric element when a hammer strikes and thus a large portion of kinetic energy caused by the hammer strike tends to be transmitted to and absorbed by the fixed container via the agent and filler. As a result, the amount of the kinetic energy which should be changed into electric energy is decreased.

SUMMARY OF THE INVENTION

The present invention aims to provide a device to obtain a high voltage to empower the striking of a piezoelectric element after resolving problems as explained in the preceding column.

This invention has the other purpose to provide a means for holding the lead line, prior to furnishing an adhesive agent as a filler on a connecting portion between the lead line of high voltage and a terminal plate of high voltage for the fixed adherence, wherein the adhesive agent is not used for the linkage of the lead line and the fixed container. This is provided by two U-shaped ditches into which the lead line is set.

The invention has another purpose to convert kinetic energy of a hammer efficiently into electric energy.

This invention has a further purpose to provide a device which is far smaller size than other piezoelectric elements.

The present invention has adopted the following means for fixing the lead line. The invention has a fixed container and a movable container moving in relation to the fixed container, both containers storing a piezoelectric element, a hammer, and other parts, where a lead line of high voltage is connected with a terminal plate equipped with a electrode side extending to the piezoelectric element, a setting plate having a U-shaped ditch into which the lead line is inserted is formed on the exit of the lead line at the fixed container, and a pair of hands is formed on the end of the plate, and the hands are bent by melting and softening over the ditch to close thereupon so that this procedure attains the tight holding of the lead line, and then an adhesive agent as a filler is inserted into the connecting portion between the lead line and the terminal plate, and thus the connecting portion is filled and fixed.

On one side of the fixed container, a lead line terminating box is established wherein the terminal plate extends and at the same time, the setting plate having a U-shaped ditch and a pair of hands is formed therein. On an upper wall of the lead line terminating box, an extra U-shaped ditch is also formed in correspondence with that of the setting plate, and the lead wire is inserted and kept in the two ditches and connected with the terminal plate, and the hands are melted and softened to be bent so that this bending invites the firm adherence and maintenance of the lead line in the ditches, and afterwards an adhesive agent as a filler is filled in the box, whereon the connecting portion between the lead line and the terminal plate is filled and fixed.

The hands are melted and softened to be bent, which confines the lead line into the ditches. Thus, the adherence is highly enhanced, and it prevents the lead line from falling off.

As explained, the hands are melted and softened for bending to close the U-shaped ditch, which does not need any extra adhesive agent at all at this point. Therefore, work efficiency to handle the lead line is highly enhanced to save working time while the durability of the linking thereupon is reasonably increased, and thus accidental falling off of the wire is prevented.

By the explained procedures, prior to filling the adhesive agent as a filler on the connecting portion between the lead line and the terminal plate, the fixed condition between the lead wire and the fixed container can be attained without using the adhesive agent thereupon.

The present invention also provides a device to obtain high voltage which comprises a fixed container and a movable container moving in relation to the fixed container, both containers storing a piezoelectric element, a hammer, and others, where a filling agent is furnished on the gap caused between the fixed container and the piezoelectric element, on the outer circumference of the piezoelectric element a parting compound which is not intimate with the filling agent is coated around. This parting compound is composed of Polytetrafluoroethylene, while the thickness of the adherent layer with this compound is 1~50 μm.

An interface between the parting compound and the filling agent, where the parting compound is coated over the element, causes a very slidable condition, and as a result, this condition decreases the absorption of kinetic energy by the fixed container. In addition, the kinetic energy transfer to electric energy efficiently is increased by the reaction of a holder supporting and fixing the piezoelectric element. This reaction extends a time of expansion and contraction work for the element. Accordingly, the kinetic energy can be changed into the electric energy at nearly 100%. As explained, the adoption of the parting compound without taking any parts or devices at all realizes the nearly full transfer of the kinetic energy into the electric energy, and therefore, it is now possible to produce smaller size competent piezoelectric element and the device in which such element is built.

BRIEF DESCRIPTION OF DRAWINGS

FIG. 4 is a vertical sectional view where a piezoelectric element is built in.

DETAILED DESCRIPTIONS OF PREFERRED EMBODIMENTS

Figure 1:
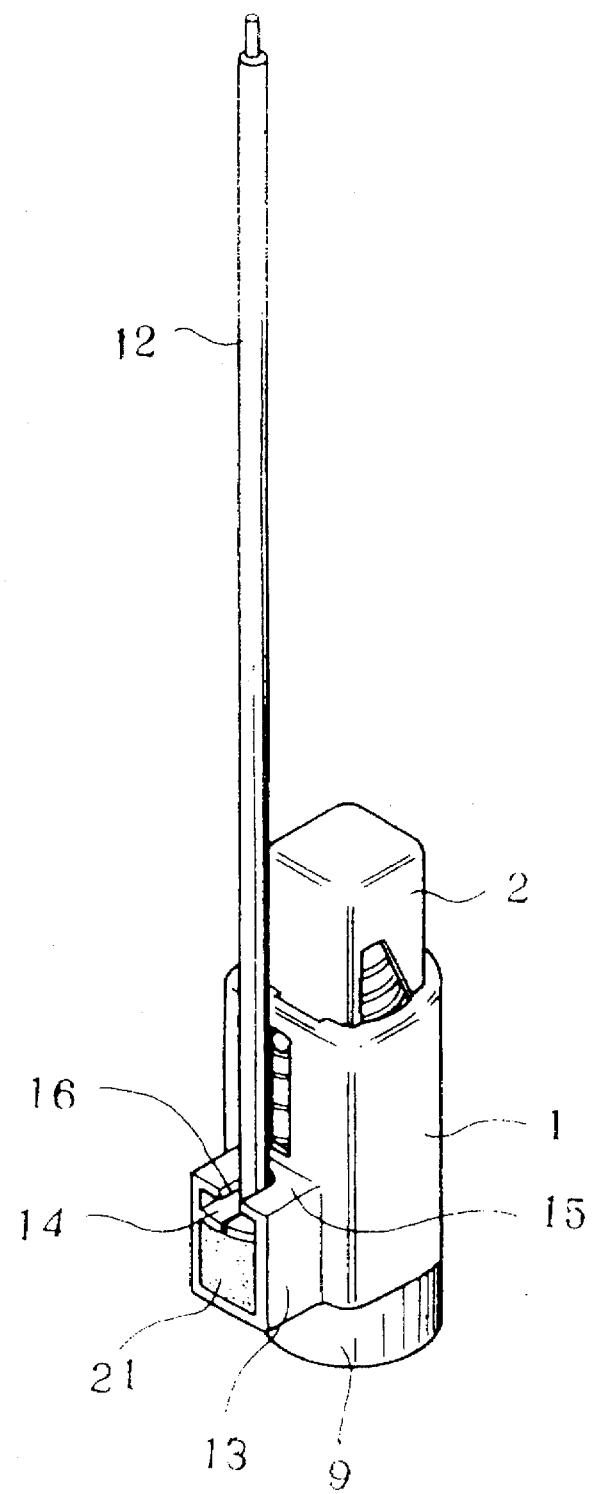
FIG. 1 is a perspective view of the device developed by this invention.

The preferred embodiment is now explained as follows with reference to the attached drawings. The numeral 1 shows a fixed container and a piezoelectric element (3) is inserted into the lower portion of the container. The fixed container (1) is of insulated quality and made of thermosetting resin. The numeral (2) is a movable container, and its lower portion is inserted into the fixed container (1) while its higher portion extends outside from the container (1). The movable container (2) is freely running axially in relation with the fixed container (1). Between the fixed container (1) and movable container (2) a return spring (4) is set to empower the movable container (2) toward outside in the constant manner. A hammer (5) is built in the movable box (2) to be movable in the axial direction. Between the hammer (5) and the movable box (2), an operating spring (6) is established and a stopper pin (7) is also equipped to hold the hammer (,5) and to regulate the movement of the hammer (5). The stopper pin (7) situates between the fixed container (1) and the movable container (2), and when the movable container (2) moves at some fixed distance, the holding is released to operate the hammer (5) in the axial direction. In other words, when the movable container (2) is moved to come into the fixed container (1) the operating spring (6) is pressed at first, and then when the movable container (2) is moved at some fixed distance, the holding of the stopper pin (7) is released and the hammer (5) shifts rapidly toward the piezoelectric element (3) by the stored power of the spring (6) and it finally hits the element (3) to generate high voltage.

Figure 2:
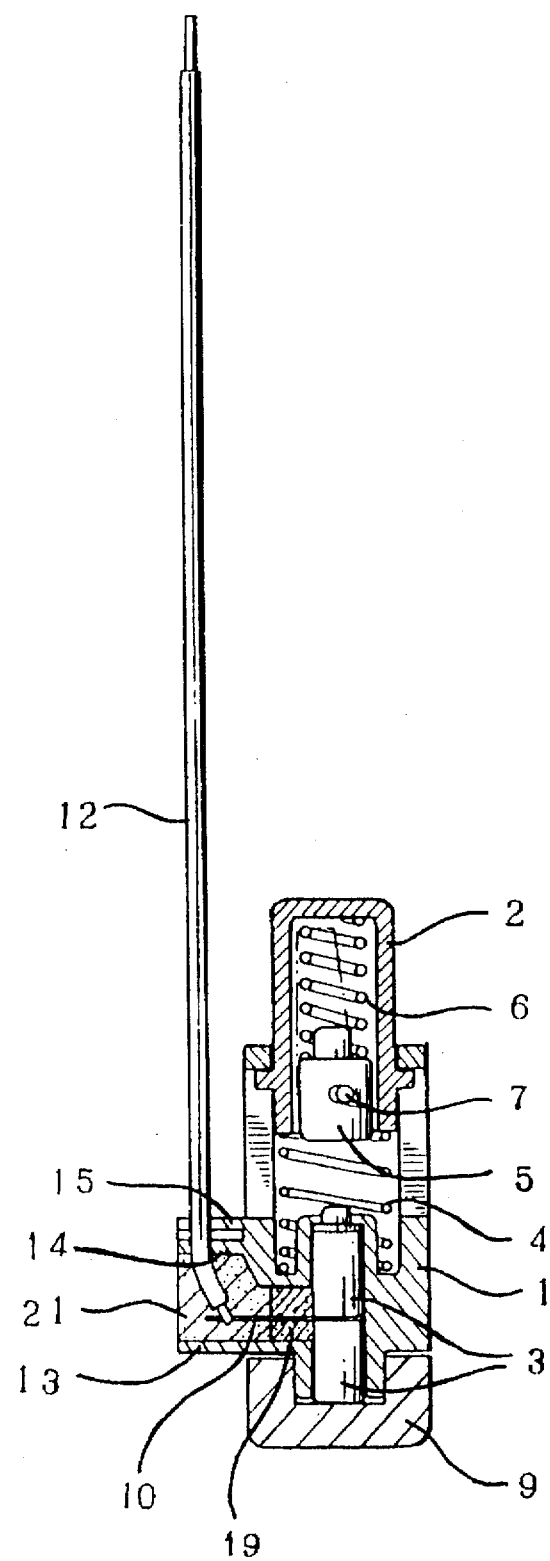
FIG. 2 is a vertical sectional view of the device.
Figure 3:
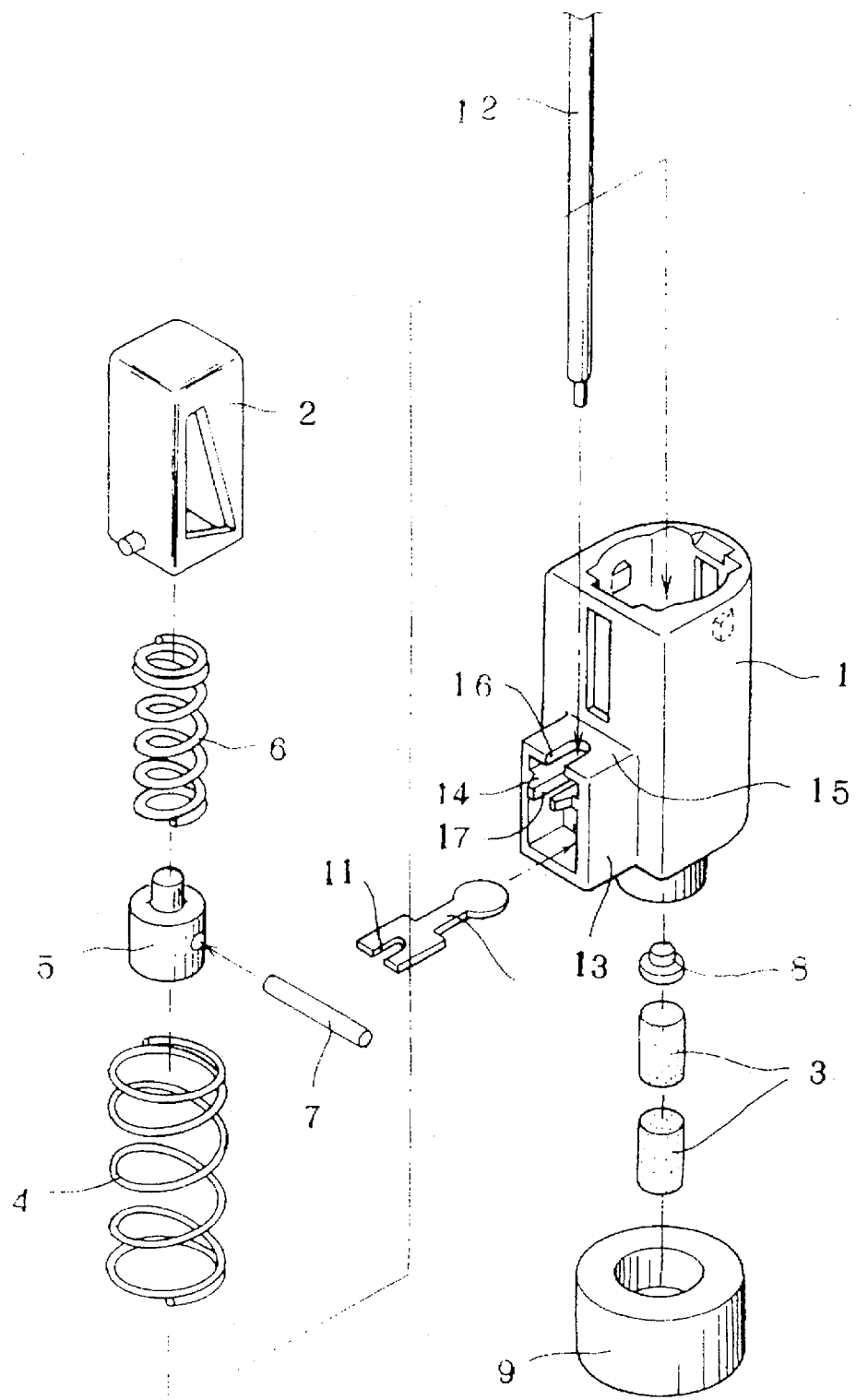
FIG. 3 is an exploded view of the device.
Figure 4:
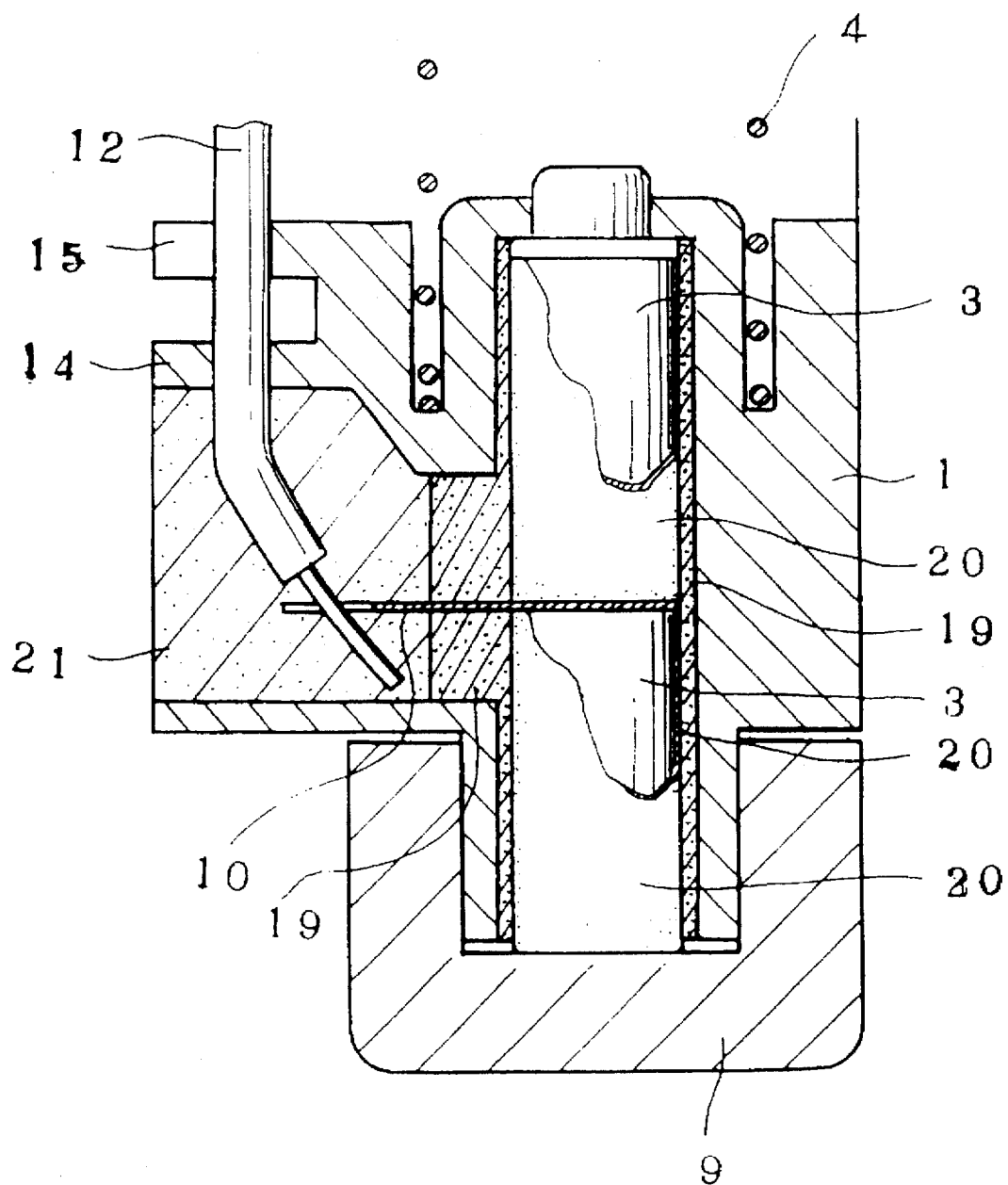
Figure 5:
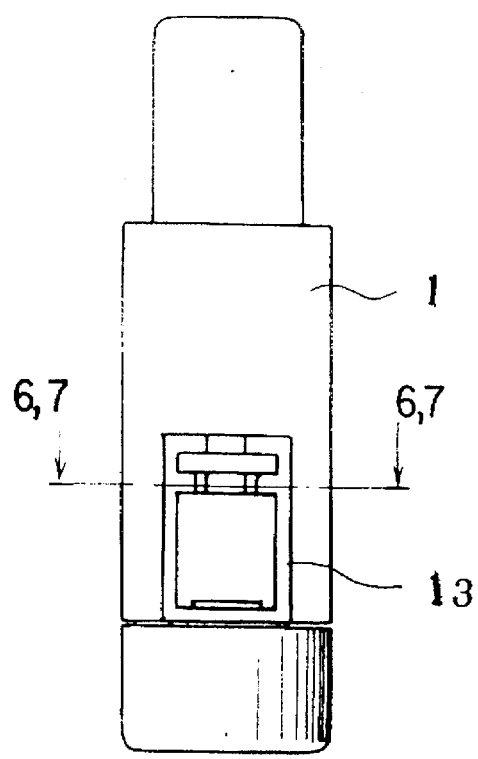
FIG. 5 is a front view of FIG. 4.
Figure 8:
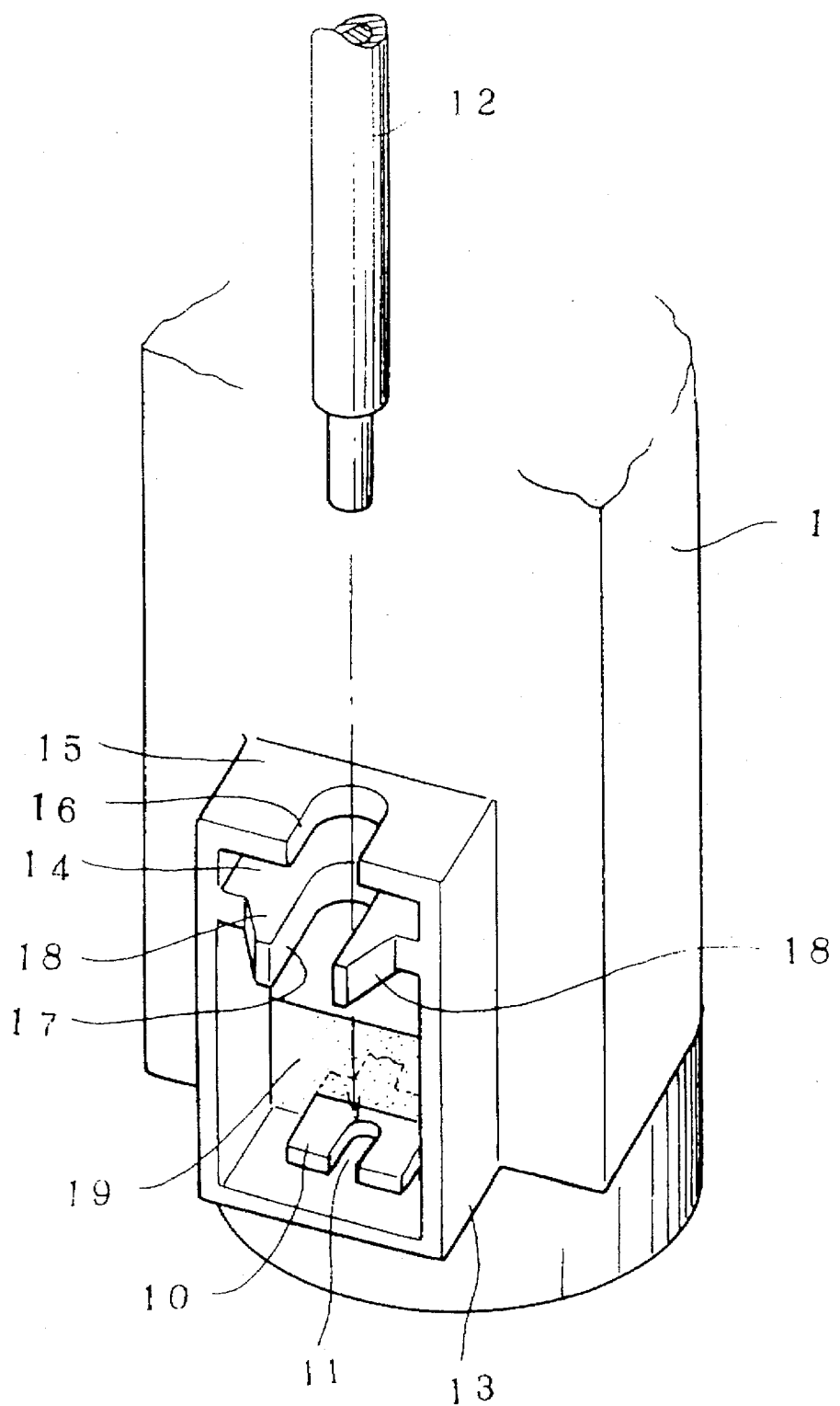
FIG. 8 is a perspective view where a lead wire of high voltage is not yet inserted.
Figure 9:
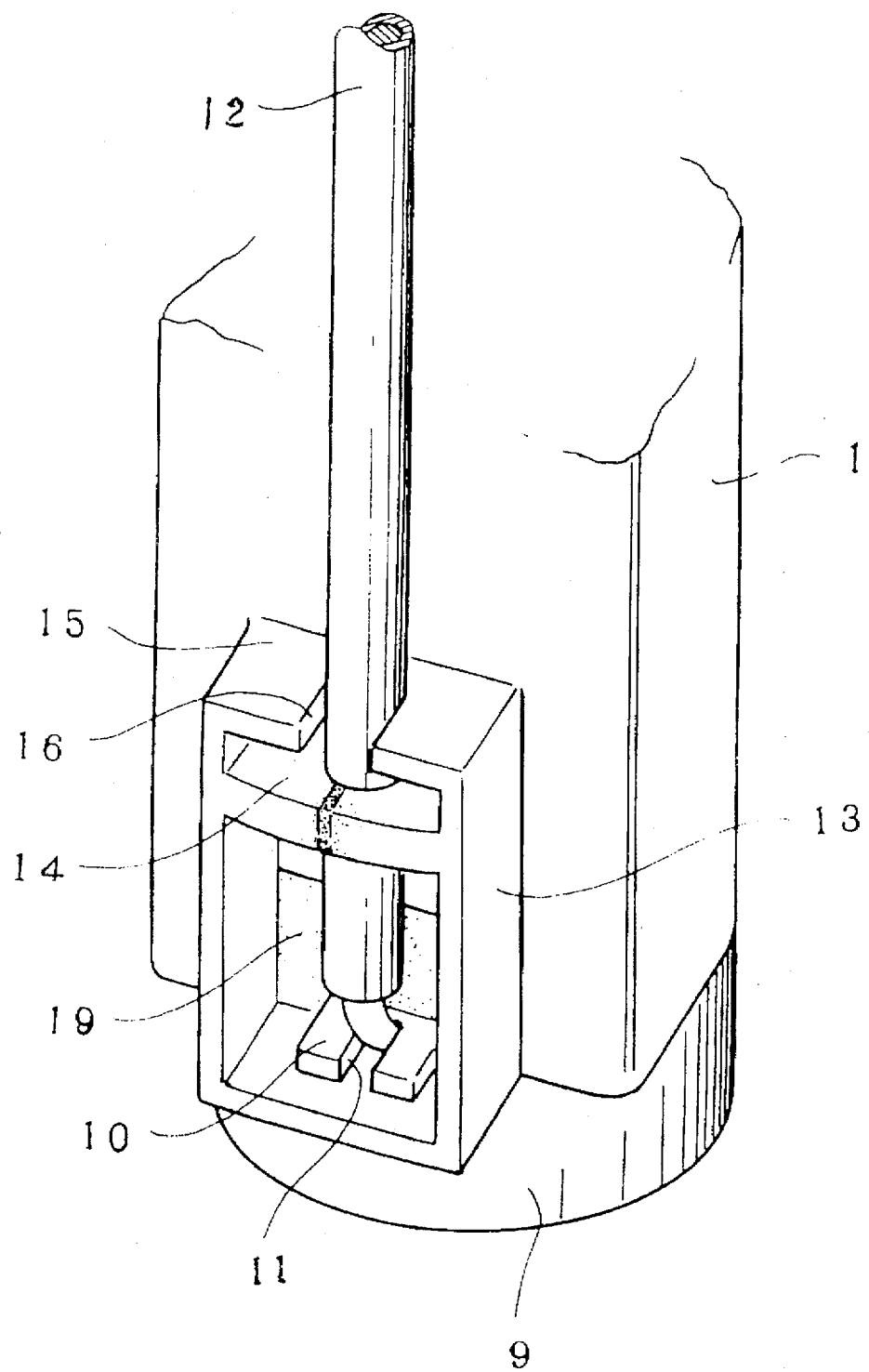
FIG. 9 is a perspective view where the lead wire is inserted and confined in a ditch.

On one end of the piezoelectric element (3) contacting the hammer (3), a shock receiving metal (8) is prepared, while on the other end a holder (9) is built, and the element (3) is sustained and supported thereby. As shown in FIGS. 2, 3 and 4, the piezoelectric element (3) comprises two units, and a high voltage terminal plate (10) is placed between the two units(3). Thus generated high voltage is obtained via this terminal plate (10). At the end of the terminal plate (10), as shown in FIG. 8, a connecting clip (11) with a U-shaped ditch is built, and an end of a lead wire of high voltage (12) is mechanically contacted and connected. The connection between the lead wire (12) and the terminal plate(10) can be made by spot welding, but in case if the device is in small size, the effecting space is too narrow to be furnished with such spot welding method.

Toward the lower portion and one side of the fixed container (1), a lead line terminating box (13) is integrally equipped as one part of the container (1), and an end of the terminal plate is extending in the box (13). In the upper portion of the box (13) a leaf of a setting plate (14) with a U-shaped ditch (16) is built separated at a small distance from an upper wall (15) with a similar ditch (17), and the plate (14) is aligned with the wall (15), while the two ditches (16, 17) are extending outward. The lead wire (12), the end of which is connected with the terminal plate (10), is inserted into the two ditches (16, 17) and kept therein, and thus the lead line (12) extends to the upward.

Figure 6:
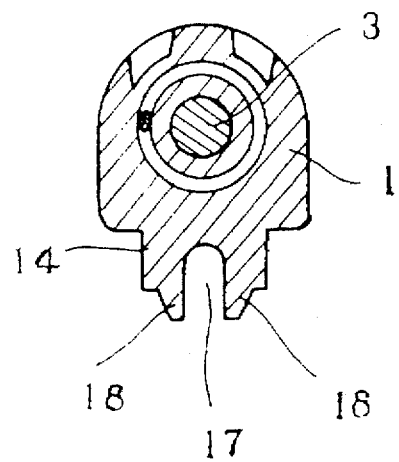
FIG. 6 is a cross sectional view along the line A–A', which shows a condition just before thermal caulking is treated.
Figure 7:
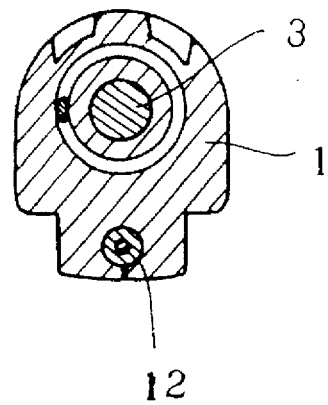
FIG. 7 is a cross sectional view along the line A–A', which shows a condition just after the thermal caulking is treated.

As shown in FIGS. 6 and 8, the setting plate (14) has a pair of hands (18) on its end extending outside along the inner wall of the ditch(17), and the hands (18) are bent inward to be connected each other by melting and softening procedures. Thus, the end of the ditch (17) is closed. By this work the lead line (12) is confined in the ditch (17) in a steady manner. The method of melting and softening procedures can be made by thermal caulking, ultrasonic vibration, or other proper means. The present embodiment has adopted following data: In order to confine the lead line (12) with a diameter of 1.2 mm, the width of the ditch (17) is 1.2 mm, and the thickness of the hand portion (18) is 1 mm while the tip end of the hand (18) is 0.3 mm while the foot portion of the hand (18) is 0.7 mm. Therefore, the shape of the hand (18) shows approximately a trapezoid. One example of preferable conditions for this procedure is as follows:

Temperature of the tip for thermal caulking 150°–250 C.

Pressure for the tip 0.1–1.0 Kg/CM$^2$

Time of pressuring 0.5 second or less

The resin material for the fixed container (1) including the setting plate (14) is properly selected from, for examples, Polyacetals or ABS.

As explained above, the lead line (12) is fixedly maintained in the ditch (17), whereas the very troublesome work to fix the lead line (12) into the device can be usefully improved and the time for this work is decreased. The fixing of the lead line (12) can be now attained without using adhesive agents at all, which eliminates the problems incurred previously. At the same time, the present invention also promotes sturdy maintenance of the lead line (12) so that accidental falling off of the lead line (12) is now avoided. After this procedure for the tight maintenance of the lead line (12) into the ditch (17), an adhesive filler agent (21) is filled into the connecting space between the lead line and the terminal plate (10) as shown in FIGS. 2 and 4, whereby this filler fixes the connecting portion and attains the insulation effect in the fixed container (1). For the adhesive agent (21), it is preferable to adopt epoxy resin or acrylic resin adhesive.

With regard to the setting plate (14), it can be also produced with considerable thickness reaching to the upper wall (15) as one part or else the bottom of the plate (14) can extend up to the middle portion of the lead line terminating box (13). When such a thick plate is adopted, it is possible to prepare plural pairs of hands (18) at separated distance on the plate.

In FIG. 4, the structure of a piezoelectric element (3) is shown. In the gap formed between the element (3) and a fixed container (1), there exists a filler (19) which is inserted from the mouth of a lead line terminating box (13), and by this filling the cracking of the element (3) is prevented and also insulation is provided. As the filler, for instance, epoxy resin adhesive agent, or rubber of silicon or urethane is used. The filler, however, restricts the lengthwise movement of the element (3), and a large amount of the kinetic energy of a hammer (5) is transmitted and absorbed into the fixed container (1) via the filler (19), and therefore, a large loss of kinetic energy which should be changed into electric energy occurs.

In order to resolve this question, this invention furnishes, on the circumferential surface of the piezoelectric element (3), a parting compound which is not intimate with the filler (19). This promotes the free movement for expansion and contraction of the element (3). By the adoption of the present parting compound, the interface between the filler where the compound is coated over the element (3) produces a very slidable condition, and the kinetic energy which is to be transmitted to the fixed container (1) is not lost. At the same time, the reaction caused by a holder (9) which supports fixedly the element, increases the time the element (3) moves and contracts. Accordingly the output of voltage and discharging energy are highly enhanced. This invention provides a smaller piezoelectric element, and attains a smaller size than the prior art devices. For example, in case if we try to obtain the similar output of voltage at 14 KV and 0.7 mJ discharging energy, which is the available and smallest device in the prior art device, the piezoelectric element developed by this invention shows a size of 1.8 mm diameter with 4 mm length. This obtained size is 18% smaller in diameter and 11% smaller in length, compared with the prior element. For the whole device, the size is changed from 30 mm into 23 mm by the adoption of the present invention for the attainment of the smaller measurement.

As the parting compound to be coated over the circumference of the element (3) it is preferable to use, for instance, Polytetrafluoroethylene or paraffin which is not intimate with the filler (19). The thickness of coated layer for the compound is preferable to be 1~50 μm, but the relative thickness is not always limited as described.

Having described the invention as related to the embodiment shown in the accompanying drawings, it is believed obvious that modification and variation of the present invention is possible in light of the above teachings.

What is claimed is:

1. A device for generating high voltage comprising:

a fixed container and a movable container, said movable container moving in relation to the fixed container, both of said containers storing a piezoelectric element;

a hammer within said movable container;

an operating spring between said hammer and movable container;

a high voltage lead line connected to a high voltage terminal plate which is connected to high voltage electrode sides of the piezoelectric elements;

a setting plate formed in a connection portion of said fixed container, having a U-shaped ditch into which the lead line is inserted;

a pair of hands formed on ends of the setting plate ditch, wherein the hands are melted and softened so as to bend them for uniting together and for closing the ditch so that the lead line is held in the ditch; and an adhesive agent filled into the connection portion for fixing a connection portion between the lead line and the terminal plate.

2. A device according to claim 1, further comprising:

on one side of the fixed container, a lead line terminating box formed, in which the terminal plate extends; and wherein said setting plate having a U-shaped ditch has a pair of hands and is formed in the terminal box.

3. A device according to claim 2, further comprising:

another U-shaped ditch formed on an upper wall of the terminating box, and aligned with the U-shaped ditch of the setting plate;

wherein the lead line inserted and held in both ditches;

wherein the line is connected with the terminal plate; and said U-shaped ditch of the setting plate having a pair of hands which are melted and softened for bending and uniting together for closing the U-shaped ditch so that the lead line is held in both ditches.

4. A device according to claim 3, further comprising:

an adhesive agent filled into the terminal box, so that a connecting portion between the lead line and the terminal plate is filled and fixed.

5. A device according to claim 1, further comprising:

a filler in a gap between the fixed container and the piezoelectric element; and a parting compound which is not intimate with the filler coated on a surface of the piezoelectric element.

6. A device according to claim 2, further comprising:

a filler in a gap between the fixed container and the piezoelectric element; and a parting compound which is not intimate with the filler coated on a surface of the piezoelectric element.

7. A device according to claim 3, further comprising:

a filler in a gap between the fixed container and the piezoelectric element; and a parting compound which is not intimate with the filler coated on a surface of the piezoelectric element.

8. A device according to claim 5, wherein said parting compound is composed of Polytetrafluoroethylene.

9. A device according to claim 6, wherein said parting compound is composed of Polytetrafluoroethylene.

10. A device according to claim 7, wherein said parting compound is composed of Polytetrafluoroethylene.

11. A device according to claim 5, wherein thickness of coated layer for a parting compound is preferably to be 1~50 μm.

12. A device according to claim 6, wherein thickness of coated layer for a parting compound is preferably to be 1~50 μm.

13. A device according to claim 7, wherein thickness of coated layer for a parting compound is preferably to be 1~50 μm.

* * * * *